Figure 1:
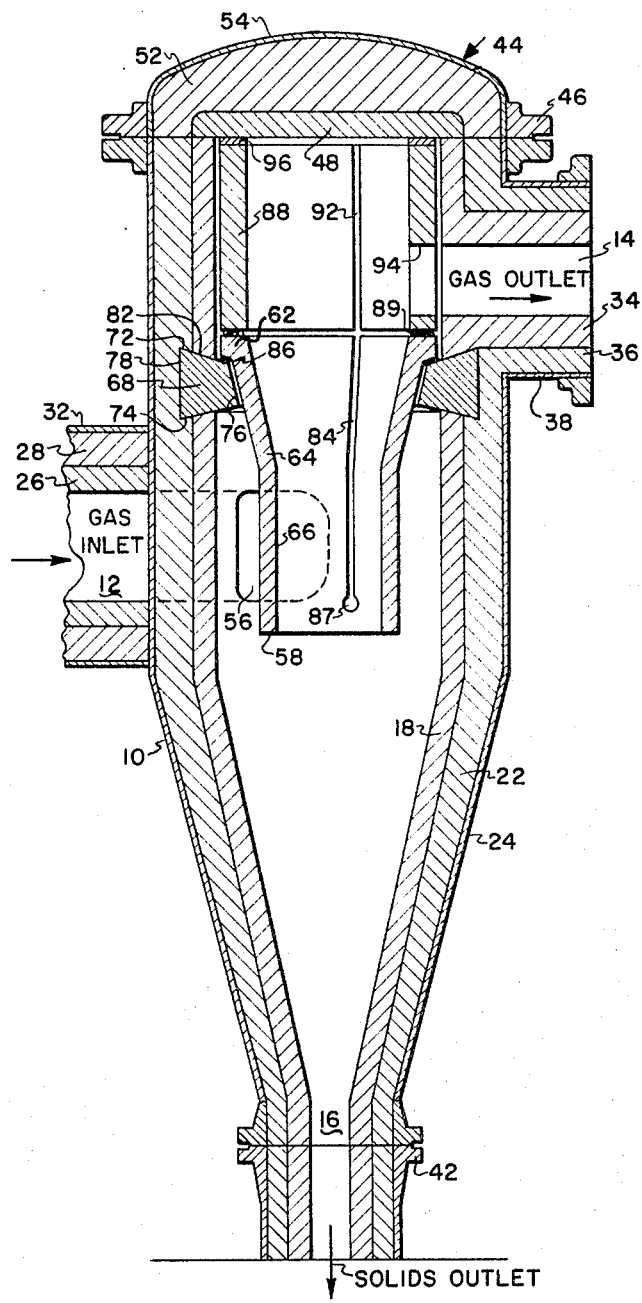

Sept. 20, 1966　　L. J. DELAUNE ETAL　　3,273,320
CYCLONE SEPARATOR FOR HIGH TEMPERATURE OPERATIONS
Filed July 15, 1963　　2 Sheets-Sheet 1

LAWRENCE J. DELAUNE
BYRON V. MOLSTEDT　　Inventors
ROBERT H. WAGHORNE
By George J. Silhavy
　　　　　　Attorney LAWRENCE J. DELAUNE
BYRON V. MOLSTEDT   Inventors
ROBERT H. WAGHORNE
By Attorney 3,273,320
CYCLONE SEPARATOR FOR HIGH
TEMPERATURE OPERATIONS
Lawrence Joseph Delaune, Byron Victor Molstedt, and
Robert Harry Waghorne, Baton Rouge, La., assignors
to Esso Research and Engineering Company, a corporation of Delaware
Filed July 15, 1963, Ser. No. 294,987
11 Claims. (Cl. 55—267)

This invention relates to cyclone separators and more particularly to cyclone separators for use in high temperature operations in the temperature range between 2000° F. and 3200° F.

It is extremely difficult to find a material which will withstand the high temperatures, thermal and mechanical shock and abrasion resistance necessary at these high temperatures above about 2000° F. Metals at these temperatures are useless because of oxidation or low abrasion resistance. Metal reinforcement in refractory material is of no value because differential thermal expansion causes the refractory to crumble.

Accordingly to the present invention an improved cyclone separator design is provided having a special cyclone outlet tube of a special design and made of refractory material such as alumina, magnesia, beryllia, silicon carbide, carbon or other refractory materials, as well as combinations of these materials. The cyclone outlet tube is constructed of such a shape as to allow limited free movement for thermal expansion and minimum internal stress concentration.

One of the unique features of the design of the present invention comprises a cyclone outlet tube or cylinder having a rounded lip or flange on the upper edge of the tube which will suspend the tube on a shalf in a cyclone separator. The flange and stress minimizing, rounded transitions are important features for eliminating sharp corners. The shelf is topped with a thin flat layer of sections of fired smooth alumina trapezoidal shaped plates. These plates reduce the friction so as to allow movement of the lip of the cyclone tube across the face of the shelf as thermal expansion and contraction occur. Other means of reducing friction are cylindrical or spherical shaped roller bearings made of a refractory material such as alumina. Refractory material other than alumina may be used for the plates or bearings.

Another unique feature of the design of the present invention comprises the provision of slits or cut away portions running vertically down from the top of the cyclone outlet tube short of the lower end of the tube. These slits can extend all the way to the bottom of the tube if desired. These slits are provided to relieve thermal stresses in the refractory material of the tube or cylinder due to thermal or temperature fluctuations.

Another unique feature of the design of the present invention is a hold down ring to prevent excessive movement or vibration of the outlet tube or cylinder from coke or gas impingement. This hold down ring or cylinder is preferably split vertically into the same number of sections as the cyclone tube so that each piece sits or rests on a similar section of the tube. The ring extends to the top of the cyclone separator. A ceramic fiber gasket material is placed between the top of the hold down ring and the roof of the cyclone separator to act as a cushion.

The cyclone separator of the present invention is especially adapted for use in high temperature cracking or conversion of hydrocarbons to produce hydrogen and coke as the main products and also for the high temperature calcination of coke where heat is supplied by heating coke particles and using them as the means for supplying heat in the process.

Figure 2:
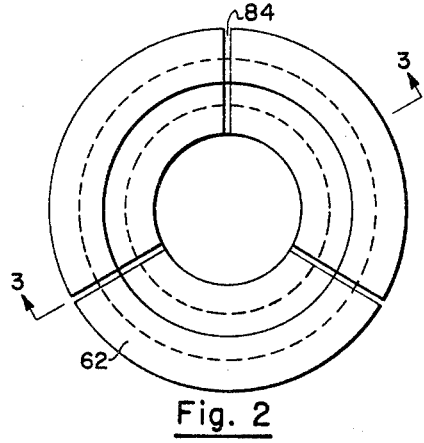
Figure 3:
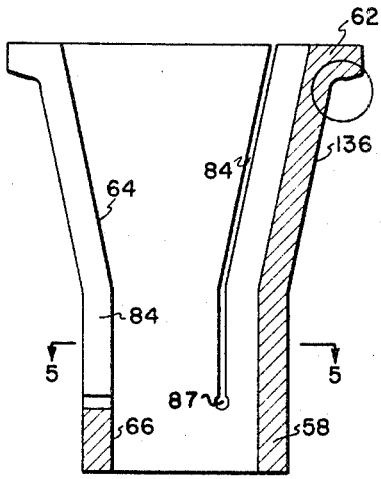
Figure 4:
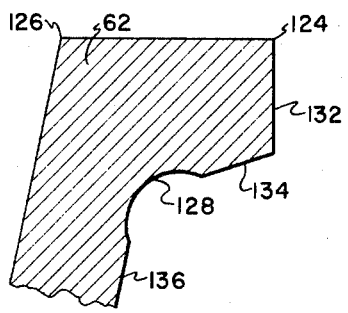
Figure 5:
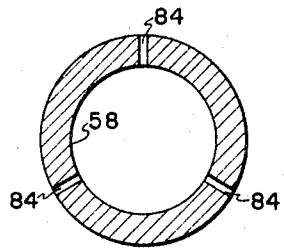
Figures 6, 7, 8:
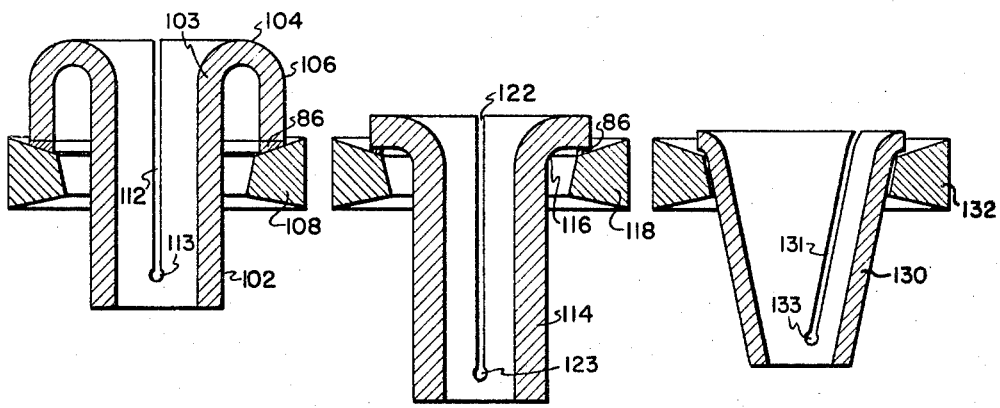

In the drawings:
FIG. 1 represents a vertical longitudinal cross section of a cyclone separator embodying features of the present invention;
FIG. 2 represents a top plan view of the cyclone tube;
FIG. 3 represents a vertical longitudinal cross section taken substantially on line 3—3 of FIG. 2.
FIG. 4 represents an enlarged detail of the flange on the cyclone tube shown in FIG. 3;
FIG. 5 represents a horizontal transverse cross section taken substantially on line 5—5 of FIG. 3; and
FIGS. 6, 7 and 8 represent partial vertical sections of modifications of the cyclone tube.

Referring now to the drawings, the reference character 10 desginates a cyclone separator having a gas-solids inlet 12 and a gas outlet 14. A solids outlet 16 is provided leading from the bottom of the cyclone separator 10. The cyclone separator of the present invention is intended and has been developed for use in separating hot solids from hot gaseous suspensions of solids having a temperature from about 2000° F. to about 3200° F. The cyclone separator 10 includes a dense refractory material interior wall 18, a surrounding heat insulation refractory material 22 and an outer metal shell 24 such as steel.

The interior wall 18 may be made from high purity alumina castable refractory or brick, or other high temperature materials such as silicon carbide and chrome castable. The heat insulation refractory 22 comprises a light weight alumina-silica castable refractory. The inlet 12 for the gas-solids suspension has an inner refractory tube 26 similar to interior 18 and a heat insulating refractory tube or surrounding layer 28 similar to refractory 22 and an external metal shell 32. The gas outlet 14 likewise has an inner refractory tube 34, a surrounding heat insulating refractory tube or material 36 and an external metal shell 38.

The lower portion of the cyclone separator 10 is funnel shaped in the conventional manner to deliver separated solids to the solids outlet 16. Flange means 42 are shown at the bottom portion of the funnel shaped portion to provide means for disassembling the cyclone separator.

The top of the cyclone separator has a removable cover 44 with flange means 46 for disassembly and having an inner refractory lining 48. Heat insulation refractory 52 is provided between the metal external shell 54 and refractory lining 48. The main body of the cyclone separator 10 is circular in horizontal cross section as in conventional cyclone separators. The gas-solids inlet 12 opens into the interior of the wall 18 in a tangential manner as in conventional cyclone separators to give the entering suspension a rotary motion. The gas-solids inlet has an opening 56 in the internal wall 18 adjacent a removably mounted cyclone tube 58.

The removably mounted cyclone tube 58 forms the main feature of the present invention and comprises a refractory tube made of alumina, magnesia or other refractory material to withstand the extremely high temperatures above about 2500° F. As shown in FIG. 1 the tube 58 has a rounded top flange or lip 62 extending outwardly from the main body of the tube 58 to provide support for the outlet tube. In the specific embodiment shown, the upper portion of the cyclone tube or cylinder 58 has a downwardly converging portion 64 for about ½ to ⅔ of its length and then has a lower open-ended cylindrical portion 66 extending slightly below the inlet 56 of the gas-solids inlet 12. The merged portions of 64 and 66 are rounded off to eliminate sharp corners. In other embodiments, the entire tube below the support lip may be a converging, conical shape or a straight cylinder.

The lip or flange 62 rests on support shelf 68 which is shown as extending completely around refractory tube 58. The shelf 68 as shown in FIG. 1 is wedge-shaped in vertical cross section and made up of one part. As shown in cross section, shelf 68 has a downwardly inclined upper face 72, an upwardly inclined lower face 74, an inwardly and downwardly tapered inner face 76 and an outer or back layer face 78. The shelf fits into an opening 82 in the inner refractory wall 18 which has inwardly tapered top and bottom sides to receive and hold the wedge shaped shelf portion 68. The tapered inner face 76 of the shelf portion is not essential. However, it can be used as a safety catch if the lip of the tube breaks. Normally it is not in contact with the tube. The cyclone tube has a plurality of slits 84 which are shown as extending down the cyclone tube 58 from the rounded top lip or flange 62. The cyclone tube 58 will be further described hereinafter in connection with FIGS. 2, 3, 4 and 5.

The shelf is topped with a flat, thin, sectional layer of fired smooth alumina, substantially trapezoidal shaped plates 86 laid adjacent each other. These layers 86 are also shown in FIGS. 6 and 7. These alumina plates reduce the friction so as to allow movement of the lip or flange 62 which rests on the shelf 68 across the face of the shelf as thermal expansion and contraction occur. Other means of reducing friction on the shelf 68 include cylindrical or spherically shaped roller bearings made of a refractory material such as alumina or other refractory material.

As shown in FIGS. 1, 2 and 3, the cyclone refractory tube 58 is provided with slits or slots 84 which extend down from the lip or flange 62 most of the way down the tube 58 to reduce stress concentrations. These slits can extend to the bottom of the tube without seriously affecting the performance. This even helps to reduce stress concentrations. Terminating the slit a slight way up from the bottom is preferred and helps in installations of the tube and also helps prevent some warpage on heat up. These slits are provided to prevent tensile and shearing stresses caused by mechanical shock or differential thermal expansion in the refractory from building up to excessive proportions, which can happen in a monolithic construction. In FIGS. 2 and 5, there are shown three slits or slots 84 in exaggerated size providing three segments. However, fewer or more segments may be provided as the number of segments is a function of tube size and about 0.9 to 3.5 segments may be required per foot of tube diameter based upon the outside diameter of the lip. The slits 84 are preferably of a small width of about 0.015 to 0.020 inch. The bottom portion of each slit 84 terminates in a "keyhole" type or enlarged opening 87. This keyhole type hole is a stress relieving means and functions to dissipate stresses produced on heating the tube.

Arranged above and resting on the lip or flange portions 62 is a hold down cylinder or ring 88 to prevent excessive movement or vibration of the outlet cyclone tube 58 from solids or gas impingement. Cylinder 88 is made of refractory material. This ring or cylinder 88 may rest on plates 89 similar to plates 86. Cylinder 88 is split vertically as at 92 in the same number of segments or sections as the upper portion of the refractory tube 58 so that each piece sits or rests on a similar section of the tube 58. The section of the cylinder or ring 88 adjacent gas outlet 14 is provided with opening 94 corresponding to the size of outlet 14.

The ring or cylinder sections 88 extend to the top of the cyclone separator housing and are held in place by top 44 of the cyclone separator. A ceramic fiber gasket material 96 is placed between the top of the hold down ring or cylinder sections 88 and the refractory lining 48 to act as a cushion.

FIGS. 6, 7 and 8 show modifications of the cyclone refractory tube 58 in FIG. 1. In FIG. 6 the refractory tube 102 has a lip 103 rounded at 180° as at 104 to form downwardly extending leg or legs 106 resting on ceramic plates 86 on shelf or shelf portions 108. Tube 102 is preferably provided with a plurality of slits, one of which is shown at 112 and which correspond to the slits shown in the form of tube shown in FIG. 1. A keyhole type opening 113 is provided in slit 112.

In FIG. 7 the tube 114 has a rounded top corner as at 116 resting on shelf portions 118. The tube 114 is preferably provided with a plurality of slits 122 similar to those in the tube in FIG. 1 and keyhole type opening 123.

In FIG. 8, the tube 130 is similar to that shown in FIG. 3 except that the body is a downwardly converging conical shape. Tube 130 has slit 131 and keyhole opening 133 and rests on shelf 132.

In the high temperature cracking or conversion of hydrocarbons to produce hydrogen and coke, many shutdowns of the process were necessary because of failure of the equipment used in separating heated solids from gas following the heating step. In the process used, a fluid bed reactor is used for cracking hydrocarbons such as naphtha at a fluid bed temperature of about 2000° F. to 2400° F. As the coke is a valuable product, it is preferred not to burn it up to supply the heat of cracking. In the known processes of using a fluid bed and a transfer line burner or heater, some of the coke particles are burned to heat the coke particles in the transfer line burner. The hot or heated coke particles are separated from the hot gases in a cyclone separator and the hot coke particles are returned to the fluid bed reactor. In the transfer line burner the coke particles are heated to a temperature of 200° F. to 600° F. higher than that in the fluid bed reactor. To minimize coke product burn-up in the transfer line burner, it is preferred to supply extraneous fuel such as natural gas to the transfer line burner and this gas is burned rather than the coke product.

It is in a process as above briefly described that because of the high temperatures and temperature variations in the cyclone separator, many failures in equipment have been experienced. Using many different shapes of refractory tubes and different refractory materials has not solved the problem. The thermal and mechanical shock imparted to the tube has resulted in tube failures.

The form of cyclone separator shown in FIG. 1 having the refractory tube 58 provided with the slits 84 and lip portions 62 resting on shelf 68 and held down by cylinder or ring sections 88 has proved successful and has been in use for an extended period and has not required a shut down of the unit because of any failure in the apparatus.

In a specific example the cyclone separator 10 has a gas inlet 12 of about 9½ inches diameter, a gas outlet 14 of about 9½ inches diameter, and a solids outlet line 16 of about 4 inches diameter.

The inner wall 18 and the shelf 68 are made of castable, high purity alumina. The cyclone tube 58 and ring or cylinder 88 are made of similar material. The diameter of the upper portion of the interior of the separating chamber bounded by refractory wall 18 is about 2 feet 3½ inches. The length of the cyclone separator from solids outlet 16 to lining 48 in top 44 is about 9 feet 11 inches.

The shelf 68 is wedged in the refractory lining 18 and has a tapered inner face 76 corresponding to the tapered upper wall 64 of central refractory cyclone tube 58.

FIG. 4 shows an enlarged detail of the lip 62 encircled in FIG. 3. The outer diameter of the top of tube 58 is about 2 feet 2½ inches and the inner diameter of the top of the tube 58 between lips or flanges 62 is about 1 foot 6½ inches. The top of lip or flange 62 has a width of about 4 inches from outer edge 124 to inner edge 126 as indicated in FIG. 4.

The upper portion 64 of the tube 58 tapers down and about halfway down the tube 58 it merges into the bottom cylindrical portion 66. The upper tapered portion 64 of the tube is about 1 foot 7⅜ inches long and the lower cylindrical portion 66 is about 11¾ inches long.

In FIG. 3, radii of at least 6″ and 8″ are essential for rounding off the merged portions of 64 and 66 of tube 58. The elimination of sharp corners is essential in order to reduce stress concentration areas in the refractory. The length of tube 58 is about 2 feet 7⅛ inches. The internal diameter of the cylindrical bottom portion 66 of tube 58 is about 11 inches and the external diameter of the portion 66 is about 1 foot 3 inches. The thickness of the wall 66 is about 2 inches. Each slit 84 is about 0.016 inch wide and about 2 feet 2⅛ inches long, terminating about 5 inches above the bottom of tube 58 in a keyhole type opening ¼ inch in diameter to minimize stress concentration.

Returning now to lip or flange 62, its rounded under portion 128 comprises an arc of a circle having a one inch radius. This rounded portion is an important part of the structure as it has been found that rounded corners improve reduction in stress concentrations. The lip 62 has a depth at outer side 132 of about 2¹⁄₁₆ inches and the bottom of the side 132 is connected to the one end of the arc of rounded portion 128 by an angular surface 134 at an angle to the horizontal of about 14°47′ and a distance inwardly from face 132 equal to about 1¼ inches measured on a horizontal line.

The other end of the arc of rounded portion 128 is connected to the vertical outer face 136 forming part of the tapered upper portion 64 of tube 58. The face 136 extends down inwardly at an angle of about 12°18′ from the vertical. A chord, if drawn connecting the ends of the arc, would be about 1¾ inches long and a radial line bisecting the chord and extending from the chord to the bottom center of the arc of portion 128 would be about ⁹⁄₁₆ of an inch.

The ring or cylinder 88 is about 1 foot 10½ inches in length and has a wall thickness of about 3 inches.

Other refractory material may be used for lining 18, tube 58, ring 88 and shelf portions 68 such as sintered alumina, beryllia, silicon carbide, carbon, magnesia, mullite, mullite bonded alumina, cermets, or combinations of these.

The cyclone separator 10 functions as a conventional cyclone separator in that gas containing solids is introduced tangentially through gas inlet 12 and opening 56 into the space between cylone tube 58 and wall 18 to give the gas stream a centrifugal motion throwing out the solids toward wall 18. The separated solids drop down and are withdrawn through solids outlet 16. The separated gas goes up through cylone tube 58 and out of the cyclone separator through gas outlet line 14.

While specific dimensions have been given for the cyclone separator, the cyclone tube 58 and related parts, it is to be understood that these are by way of example only and the invention is not intended to be limited thereto. The removably mounted refractory cyclone tube 58 with its slits and rounded corners forms an important part of the invention. The slits 84 relieve mechanical and thermal stresses in the refractory tube 58 and permit some unrestricted expansion and contraction of the refractory cyclone tube 58 when used at high temperatures above about 2000° F. without ruining the tube 58.

What is claimed is:

1. A cyclone separator particularly adapted for use in operations above 2000° F. which includes an enclosing metal wall with a tangential entry for solids-laden gases, separate outlets for gases and solids, refractory walls contiguous to and lining the metal wall, refractory linings for the said entry and outlets, a support shelf circumferentially mounted within and projecting inwardly from the side walls, a separate refractory cyclone tube located within the confines of the enclosing walls, said tube being provided with a plurality of longitudinal slits extending through the refractory wall, downwardly from the top and terminating short of the bottom of the tube, said tube having an outwardly projecting upper flange portion which provides a lip, the lower side of which impinges upon said shelf to position and space the tube away from the walls and within a space separating the entry and outlets, a refractory hold-down ring resting upon the top of the flange and located between the cyclone tube and the refractory lined metal wall enclosing the top of said cyclone separator by virtue of which arrangement excessive movement and vibrations of the cyclone tube by impingement thereupon of solids and gases is prevented.

2. An apparatus according to claim 1 wherein the upper portion of said refractory cyclone tube tapers inwardly.

3. An apparatus according to claim 1 wherein hold down ring is provided with the same number of longitudinal slits as in the refractory cyclone tube so that the projecting segments formed by the separating slits of the ring can be rested upon similar segments formed by the slits of the tube.

4. An apparatus according to claim 1 wherein the lip of the flange of said refractory cyclone tube has a rounded upper side.

5. An apparatus according to claim 4 wherein the rounded upper side of the lip forms a downwardly extending projection for resting on the top of the support shelf.

6. A cyclone separator particularly adapted for use in high temperature operations which includes a generally cylindrical enclosing metal side wall, the top of which is capped by an upper metal wall, said metal side wall containing a tangential entry for solids-laden gases, separate outlets for gases and solids, refractory inner walls contiguous to and lining the interior of all of the metal walls and refractory linings for the tangential entry and outlets, a support shelf intermediate the top and bottom of the metal side walls circumferentially mounted within and projecting radially inwardly from the side walls, a separate refractory cyclone tube of smaller diameter than than of said side walls, said tube being provided with an outwardly projecting, upwardly rounded, flanged top portion, said cyclone tube being supported in position by the lower side of said flanged top resting upon said shelf, said cyclone tube having at least one vertical slit extending downwardly from the flanged top terminating short of the bottom of the tube, and a refractory hold-down ring containing at least one longitudinal slit which rests upon the top of the flange and is located between the cyclone tube and the refractory lined metal upper wall of said cyclone separator by virtue of which arrangement excessive movement and vibrations of the cyclone tube by impingement thereupon of solids and gases is prevented.

7. An apparatus according to claim 6 wherein the terminal end of the slit near the bottom of the tube is provided with a keyhole-type opening for dissipation of stresses.

8. An apparatus according to claim 6 wherein the terminal ends of the slit of the refractory hold-down ring is provided with a keyhole-type opening for dissipation of stresses.

9. Apparatus according to claim 6 wherein the ring is provided with a plurality of slits corresponding in number to the number of slits within the refractory cyclone tube so that each segment formed by the separating slits of the ring can rest upon a similar segment of the tube.

10. An apparatus according to claim 6 wherein a ceramic fiber gasket material is placed between the hold down ring and the refractory lined upper wall of the cyclone separator to act as a cushion.

11. An apparatus according to claim 6 wherein fired, smooth, alumina, trapezoidal shaped, friction-resistant plates are located between the lip of the cyclone tube and the face of the shelf to allow limited movement as thermal expansions and contractions occur.

References Cited by the Examiner

UNITED STATES PATENTS

| | | | |
|---|---|---|---|
| 1,844,369 | 2/1932 | Ross | 55—412 X |
| 2,878,110 | 3/1959 | Altsaedt et al. | 55—267 |
| 3,070,990 | 1/1963 | Krinov | 55—268 X |

FOREIGN PATENTS

| | | |
|---|---|---|
| 861,495 | 1/1953 | Germany. |
| 1,049,671 | 1/1959 | Germany. |
| 331,755 | 7/1930 | Great Britain. |
| 762,070 | 11/1956 | Great Britain. |

HARRY B. THORNTON, *Primary Examiner.*

L. H. McCARTER, *Assistant Examiner.*